June 3, 1930.     F. CLARK     1,761,653
CAN FILLING MACHINE
Filed Jan. 10, 1927     6 Sheets-Sheet 1
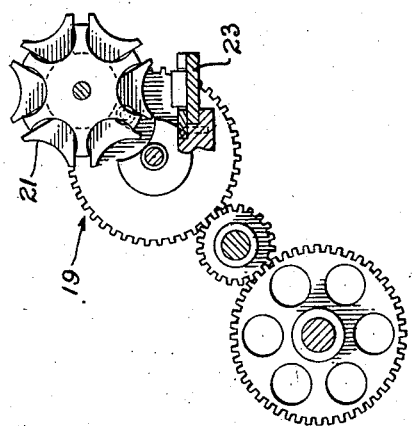
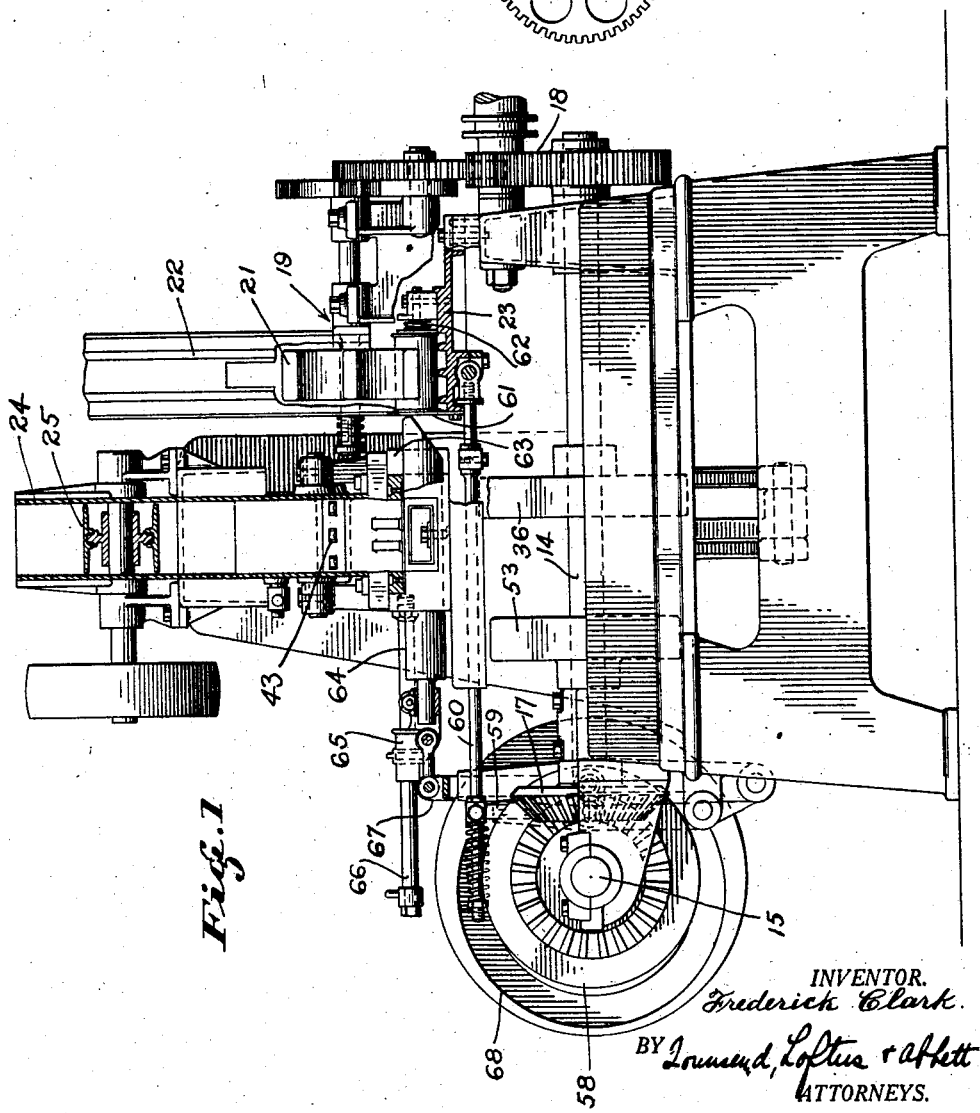
INVENTOR.
Frederick Clark.
BY Townsend, Loftus & Abbett
ATTORNEYS.

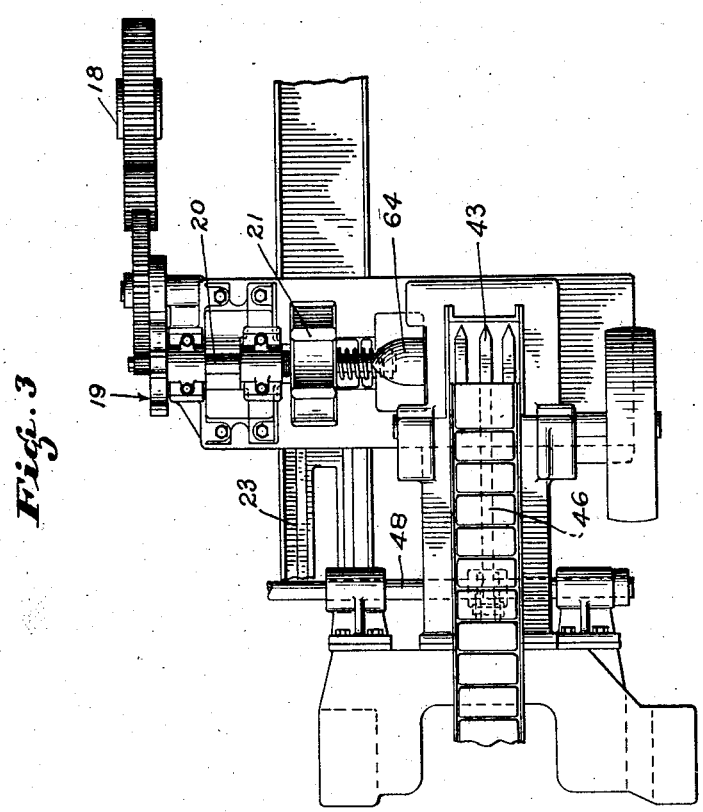

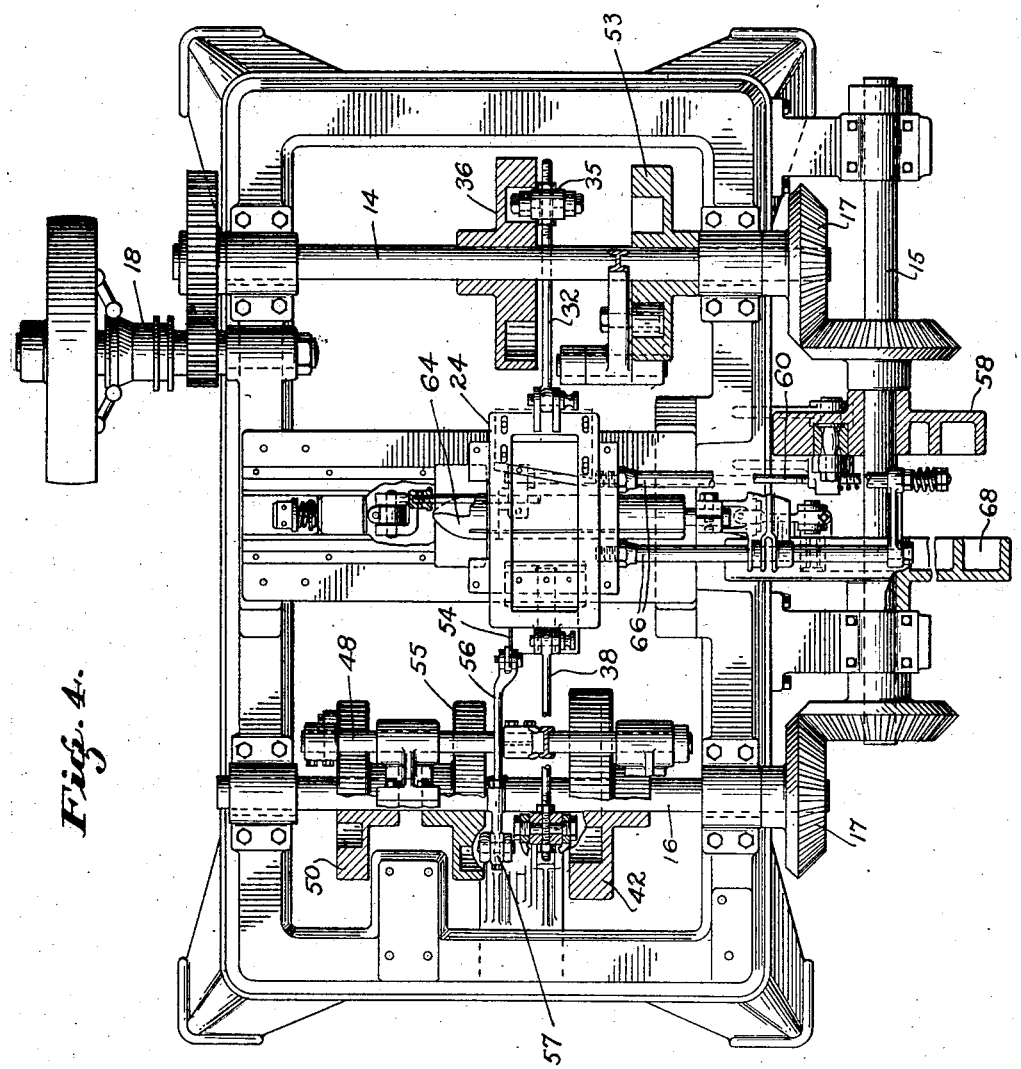

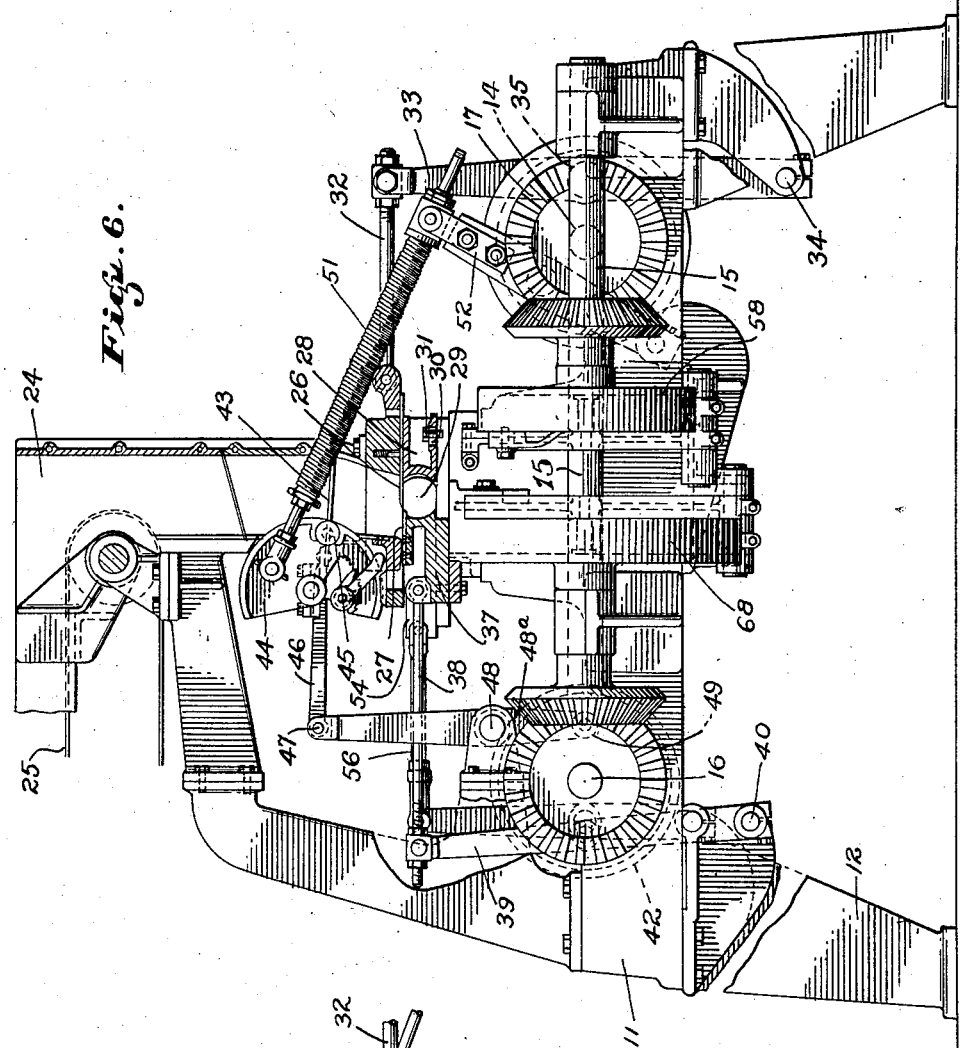

June 3, 1930.　　　　F. CLARK　　　　1,761,653
CAN FILLING MACHINE
Filed Jan. 10, 1927　　6 Sheets-Sheet 5
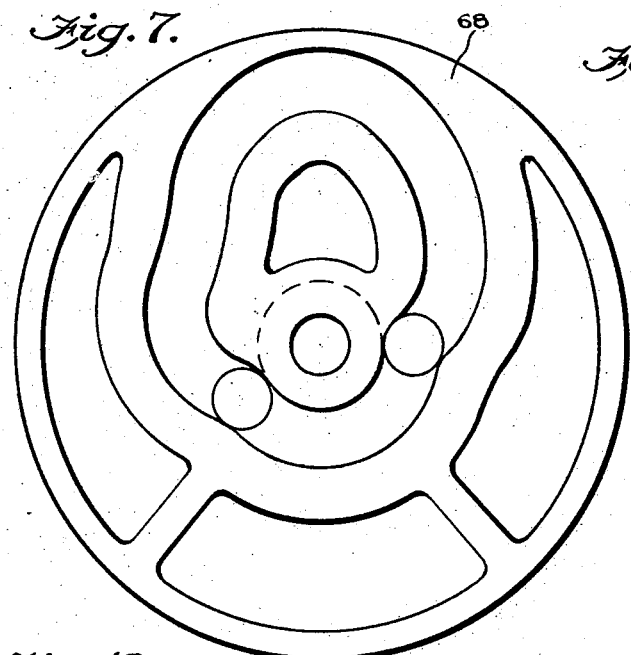
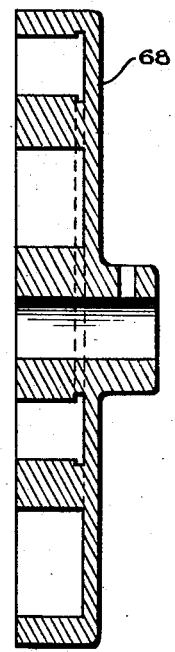
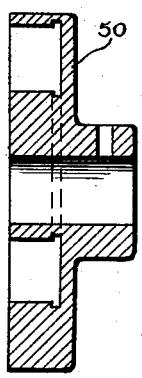
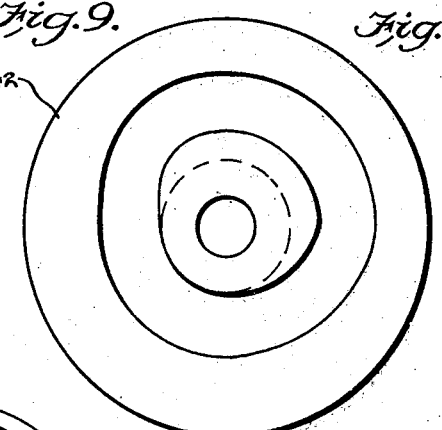
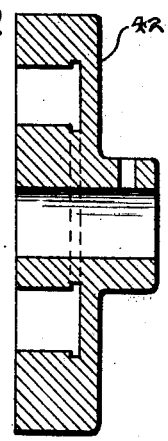
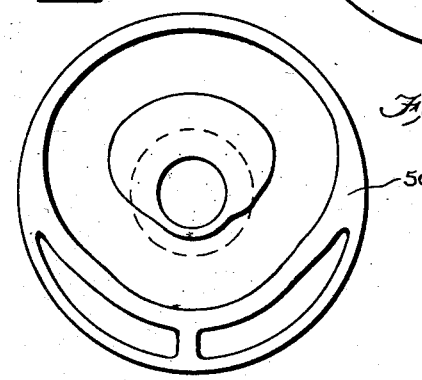
Inventor
Frederick Clark,
By Townsend, Loftis & Abbett
Attorneys June 3, 1930. F. CLARK 1,761,653
CAN FILLING MACHINE
Filed Jan. 10, 1927 6 Sheets-Sheet 6
Fig. 13.
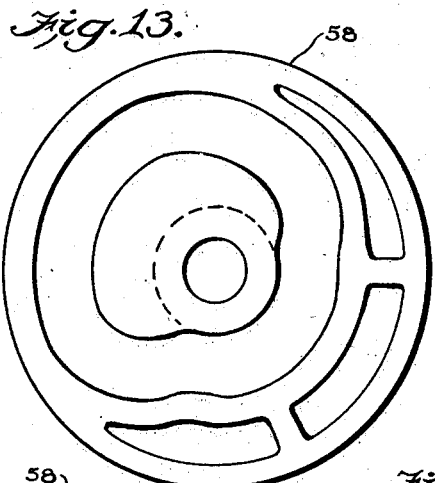
Fig. 17.
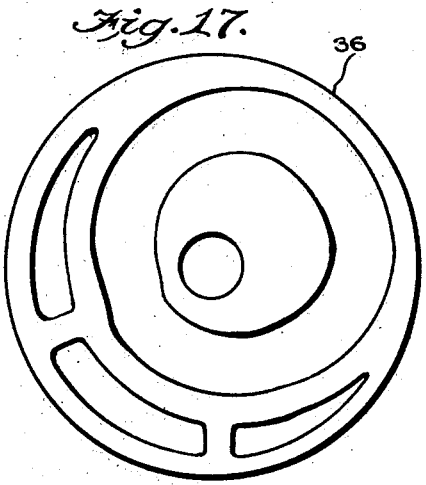
Fig. 14.
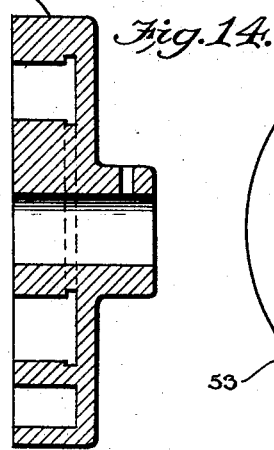
Fig. 15.
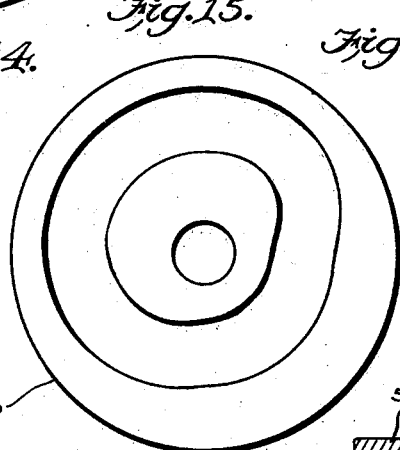
Fig. 18.
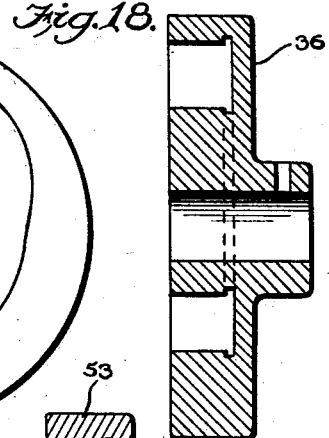
Fig. 19.
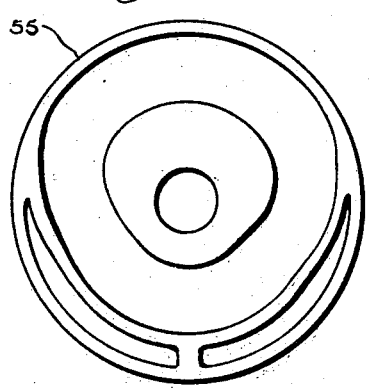
Fig. 20.
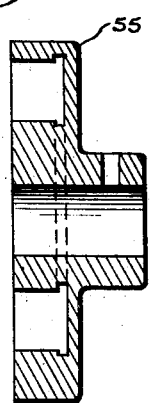
Fig. 16.
Inventor
Frederick Clark,
By Townsend, Loftus & Abbett
Attorneys Patented June 3, 1930

1,761,653

UNITED STATES PATENT OFFICE

FREDERICK CLARK, OF ALAMEDA, CALIFORNIA, ASSIGNOR TO ALASKA PACKERS ASSOCIATION, OF SAN FRANCISCO, CALIFORNIA, A CORPORATION OF CALIFORNIA

CAN-FILLING MACHINE

Application filed January 10, 1927. Serial No. 160,075.

This invention relates to can filling machines and particularly pertains to machines for filling cans with fish.

It is the principal object of the present invention to generally improve the construction and operation of machines of the character referred to whereby to provide a can filling machine wherein the mechanism is accessible and capable of functioning positively and rapidly in exact timed relation so that the machine will have a large capacity.

One form which the invention may assume is exemplified in the following description and illustrated by way of example in the accompanying drawings, in which:

Fig. 1 is a side elevation of the machine with parts in section disclosing a machine embodying the preferred form of my invention.

Fig. 2 is a view of the drive gear train and the Geneva movement for operating the can feed.

Fig. 3 is a plan view of the upper portion of the machine.

Fig. 4 is a plan view of the machine with certain of the superframe removed and with parts in section to disclose certain features of construction.

Fig. 5 is a fragmentary view in central section through the measuring box and compressing chamber showing the fork in a position just after penetrating the fish.

Fig. 6 is a side elevation of the machine with parts broken away and in section showing the operating parts of the machine.

Fig. 7 is an elevation of the plunger actuating cam.

Fig. 8 is a transverse sectional view of the same.

Fig. 9 is an elevation of the cam which actuates the lower knife.

Fig. 10 is a transverse sectional view of the same.

Fig. 11 is an elevation of the fork operating cam.

Fig. 12 is a transverse sectional view of the same.

Fig. 13 is an elevation of the can slide operating cam.

Fig. 14 is a transverse sectional view of the same.

Fig. 15 is an elevation of the drum operating cam.

Fig. 16 is a transverse sectional view of the same.

Fig. 17 is an elevation of the cam which actuates the upper knife.

Fig. 18 is a transverse sectional view of the same.

Fig. 19 is an elevation of the gate operating cam.

Fig. 20 is a transverse sectional view of the same.

Referring more particularly to the accompanying drawings, I have illustrated a machine comprising a frame 11 having legs 12 upon which it is supported. The frame 11 is fitted with bearings in which are journaled three cam shafts 14, 15 and 16. The shafts 14 and 16 are disposed parallel at a spaced distance apart, while the shaft 15 is arranged at right angles thereto. At the ends of the shafts 14 and 16 bevel gears 17 are secured which mesh with similar gears on the shaft 15 so that a drive transmitted to the shaft 14 from a drive mechanism 18 will drive all of the shafts 14, 15 and 16 in unison at a uniform rate of speed. The drive mechanism 18 may be of any suitable type which will drive the shafts at the desired rate of speed and is therefore not described in detail.

Operatively associated with the drive mechanism 18 is a cam feed mechanism indicated by the numeral 19 in Figs. 1, 2 and 3. This mechanism includes a shaft 20 journaled above the frame and carrying a feed wheel 21. This feed wheel is intermittently operated to receive cans from a chute 22 and position them singly on a can carirage 23 in synchronism with the operations of certain other parts of the machine, as will be hereinafter described. The feed wheel 21 is driven intermittently by a Geneva movement which is driven by a gear train from the main drive 18. The gear train and Geneva movement mentioned are shown clearly in Figs. 1 and 2.

Arranged centrally above the machine and supported by the frame thereof is what I prefer to term a measuring box 24. The upper end of this measuring box is open and a conveyor 25 penetrates the same and is adapted to deliver fish cut to length to the measuring box, the measuring box being of the same width as the length of the portions of fish delivered thereto.

Disposed beneath the open lower end of the measuring box are a pair of cutting blades 26 and 27. The blade 26 is what I prefer to term an upper knife and the blade 27 what I prefer to term a lower knife. The upper knife 26 is slidably disposed between the lower end of the measuring box and a block 28 which is secured beneath the measuring box on the frame. The inner end of this block 28 is concave so that it forms one wall of a compressing chamber 29. It should be stated that the block 28 is adjustable toward and away from the center of the compressing chamber 29 by means of a slot 30 in its lower wall through which a stud 31 projects. By loosening this stud 31 the block 28 may be moved toward and away from the center of the compressing chamber 29 to change the dimensions of the chamber when desired.

It is seen that the upper knife 26 is slidable between the block 28 and the lower end of the measuring box. At its outer end this upper knife 26 is connected by a pitman 32 to an arm 33. The lower end of this arm 33 is pivoted to the frame as at 34. Intermediate its ends the arm 33 is provided with a cam roller 35 which engages the groove of a box cam 36 which is secured on the shaft 14. The formation of the groove in this cam is such that the upper knife 26 will be operated in proper relation to other elements of the machine as will be described.

Cooperating with the upper knife 26 is the lower knife 27 which is secured on a reciprocable block 37. This block is adapted to reciprocate between the lower end of the measuring box 24 and the frame and its inner end is concaved oppositely to the inner end of the block 28, so that the two unite with the blades and the frame in forming the compressing chamber 29.

The block 37 is connected by a pitman 38 to an arm 39 which is pivoted to the frame at its lower end as indicated by the numeral 40. Intermediate its ends this arm 39 is fitted with a cam roller 41 which engages the groove in a box cam 42 secured on the shaft 16. The formation of this groove and the arrangement of the cam on the shaft 16 is such that the block 37 and its knife 27 will be reciprocated at proper intervals to cooperate with the upper knife 26 in cutting off the fish and compressing it within the compressing chamber 29.

For purposes of more clearly understanding the operation of the knives, it should be stated that at the commencement of operation of the machine the fish is delivered to the measuring box 24 and forced downwardly into the compressing chamber 29 by a fork 43. This fork is carried by an oscillating drum 44 arranged at one side of the measuring box 24 and projecting a short distance therein. The fork 43 is slidably disposed in a roller 45 which is rotatably mounted adjacent the periphery of the drum 44. The fork 43 is secured at the end of an arm 46 which is pivotally connected to a vertically extending cam arm 47, the lower end of which is secured on a horizontal shaft 48. Also secured on this shaft is a cam arm 48ª carrying a cam roller 49 at its lower end, which engages the groove of a box cam 50 secured on the shaft 16. The groove of this cam and its relation to the other cams is such that the fork will be operated in synchronism with the cutting knives and other operative parts of the machine.

When the fish has been delivered to the measuring box 24 by the conveyor 25, the fork 43 is withdrawn in a raised position (see Fig. 6). In this position the reciprocable block 37 is withdrawn, enlarging the compressing chamber 29. The fork 43 is then projected through the fish in the measuring box and the drum 44 is slightly rotated in the direction of the arrow A in Fig. 5 so as to press the fork downwardly, pressing the fish tightly within the chamber 29. The drum 44 is operated by a spring tensioned arm 51 which is connected to a cam arm 52. This cam arm is operatively connected with a box cam 53 on the shaft 14.

After the fish has been pressed tightly within the compressing chamber 29, the upper knife 26, the lower knife 27 and the reciprocable block 37 are moved inwardly. The knives cooperate to cut off the fish while the block 37 compresses the fish within the chamber 29 against the stationary block 28.

During this period the exit end of the compressing chamber 29 is closed by a gate 54 which is operated by a box cam 55, the connection being shown in Fig. 4 where it is seen that the gate 54 is fitted with an arm 56 which in turn is connected with a cam arm 57 pivoted at its lower end to the frame. This cam arm is fitted intermediate its ends with a roller which engages a groove in the cam 55 which is secured on the shaft 16 so that it will be driven with the other cams. After the fish has been compressed within the chamber 29 the cam 55 actuates the arm 57 to withdraw the gate and uncover the exit opening of the compressing chamber 29.

Immediately this is done a plunger (see Figs. 1 and 4) which is substantially of the same diameter and form as the compressing chamber 29 projects into the end of the chamber 29 and is forced therethrough, transferring the fish in the compressing chamber 29 from the chamber to a can which in the meantime has been delivered and held in alignment with the exit opening of the compressing chamber.

The can positioning device and the plunger operating mechanism are both driven from cams which are secured on the shaft 15. One of these cams or that indicated by the numeral 58 operates an arm 59 which is connected by a rod 60 to the can carriage 23. The arm 59 is vertically disposed at the end of the machine contiguous to shaft 15 and is pivotally connected at its lower end to the frame. At its upper end the arm 59 is connected to the rod 60 which in turn is connected to the can carriage. Intermediate its ends the arm 59 is fitted with a roller which engages a groove in the box cam 58. A can delivered to this carriage 23 is placed intermediate a stripper 61 and a spring-pressed plate 62. After a can has been delivered to the carriage the latter is drawn toward the measuring box and the can is mounted over a guide member 63 surrounding the exit opening of the chamber 29. The can is disposed in this position until the plunger indicated by the numeral 64 passes through the compressing chamber 29 and transfers the contents thereof into the can.

To operate the plunger it is connected to a crosshead 65 which is slidably disposed on a pair of parallel rods 66. The crosshead is connected with the upper end of an arm 67 which is fitted with a cam roller which engages the groove of a cam 68 secured on the shaft 15. The formation of the grooves in the cams 58 and 68 is such that after the plunger 64 has passed through the compressing chamber 29, the plunger 64 and the can carriage move in unison until the can is disengaged from the guide 63. At this point the plunger is withdrawn and the can feed wheel 21 is operated to discharge the filled can from the carriage and replace it with an empty can.

The discharged can travels out through a chute in an upright position onto a conveyor which conveys it from the machine. After this operation the cams of the machine have returned the operating parts to starting position for a successive operation.

In operation of the device a drive is transmitted from the drive mechanism 18 to the shaft 14 which transmits it to the shafts 15 and 16, thus driving all the cams in unison. At the commencement of operation a can is positioned on the carriage 23 and the carriage is drawn forwardly to position the can over the guide member 63 contiguous to the exit opening of the compressing chamber 29. The fish delivered to the measuring box 24 by the conveyor 25 is engaged by the fork 43, the fork 43 being operated by the cam 50 which swings the arm 47 inwardly, forcing the fork through the fish in the measuring box. At this point the cam 53 draws the upper end of the arm 52 outwardly, swinging the drum 44 in the direction of the arrow A in Fig. 5. This motion or movement of the drum 44 swings the fork 43 downwardly tightly pressing the fish within the compressing chamber 29.

It should be stated that during the foregoing operations that the upper and lower knives 26 and 27 are withdrawn and that the gate 54 is in closed position; thus the compressing chamber 29 is enlarged to receive the fish from the measuring box.

As soon as the fish is pressed tightly within the compressing chamber 29 by the fork, the upper and lower knives 26 and 27 move toward each other to cut off the fish and compress it as heretofore described within the compressing chamber 29. In compressing fish it is formed into a cartridge substantially the size of a can.

The cam 55 then operates to withdraw the gate 54, uncovering the exit opening of the compressing chamber 29. At this point the plunger 64 commences operation as its cam 68 moves the crosshead 65 toward the compressing chamber forcing the plunger therethrough. As the plunger passes through the compressing chamber 29, it forces the fish therein into the can positioned contiguous to the exit opening of the chamber.

After the fish has been transferred from the compressing chamber 29 to the can, the cam 58 commences to operate the can carriage 23 and the plunger 64 and the can carriage move in unison away from the measuring box until the end of the strokes of the two cams are reached. At this point the can delivering wheel 21 operates to discharge the filled can from the carriage and position an empty can thereon, and the plunger 64 is withdrawn from the chamber 29.

Immediately these operations take place the knives and gate are returned to normal positions and the fork is withdrawn through the drum 44 and the latter is also returned to normal position for a succeeding operation.

While I have shown the preferred form of my invention, it is to be understood that various changes may be made in its construction by those skilled in the art without departing from the spirit of the invention, as defined in the appended claims.

Having thus described my invention, what I claim and desire to secure by Letters Patent is:

1. In a machine of the character described, a frame, spaced parallel transverse cam shafts mounted on the frame at opposite end portions thereof and provided with cams, a measuring box located between the transverse shafts, a stationary block positioned beneath the measuring box at one side of the center thereof, a reciprocable block at the other side of the center of the measuring box, said blocks forming opposite walls of a compression chamber, an upper knife reciprocably mounted intermediate the measuring box and the stationary block, a lower knife carried by the reciprocable block, means for operatively connecting the reciprocable knife and the reciprocable block with the cams of the proximate shafts, and means for rotating the cam shafts.

2. In a machine of the character described, a frame, spaced parallel transverse cam shafts mounted on the frame at opposite end portions thereof and provided with cams, a longitudinal cam shaft mounted on the frame at one side of the same, a measuring box located between the transverse cam shafts, a stationary block positioned beneath the measuring box at one side of the center thereof, a reciprocable block at the opposite side of the center of the measuring box, said blocks forming opposite walls of a compression chamber, an upper knife reciprocably mounted intermediate of the measuring box and the stationary block, a lower knife carried by the reciprocable block, means for operatively connecting the reciprocable knife and the reciprocable block with the cams of the proximate transverse shafts, a can carriage movable toward and from the compression chamber, a reciprocable plunger movable through the compression chamber, means for operatively connecting the plunger and the can carriage with the longitudinal shaft, and means for rotating the said shafts.

3. In a machine of the character described, a frame, spaced parallel transverse cam shafts mounted on the frame at opposite end portions thereof and provided with cams, a longitudinal cam shaft mounted on the frame at one side of the same, a measuring box located between the transverse cam shafts, a stationary block positioned beneath the measuring box at one side of the center thereof, a reciprocable block at the opposite side of the center of the measuring box, said blocks forming opposite walls of a compression chamber, an upper knife reciprocably mounted intermediate of the measuring box and the stationary block, a lower knife carried by the reciprocable block, means for operatively connecting the reciprocable knife and the reciprocable block with the cams of the proximate transverse shafts, a can carriage movable toward and from the compression chamber, a reciprocable plunger movable through the compression chamber, means for operatively connecting the plunger and the can carriage with the longitudinal shaft, can feeding means including a feeding wheel and a train of gears connected with one of the transverse shafts, and means for rotating the cam shafts.

FREDERICK CLARK.